United States Patent Office 3,404,125

Patented Oct. 1, 1968

1

3,404,125

EPOXY RESIN COMPOSITIONS CONTAINING DIENOPHILE CURING AGENT AND POLY-CYCLODIENES

Wen-Hsuan Chang, Gibsonia, Pa., assignor to PPG Industries, Inc., a corporation of Pennsylvania No Drawing. Filed July 10, 1963, Ser. No. 294,190

16 Claims. (Cl. 260—47)

This invention relates to novel epoxide resin compositions and to cured epoxide resins prepared therefrom. More particularly, this invention pertains to epoxide resin compositions containing as a reactive diluent a tricyclo-[4.3.0.1$^{2,5}$]decadiene, including lower alkyl substituted and halo substituted tricyclo[4.3.0.1$^{2,5}$]decadienes.

Epoxide resins have found numerous applications in the formulation of coatings, castings, and adhesives. Cured epoxide resins generally have excellent alkali and acid resistance, hardness, flexibility, and weather resistance, which are highly desirable properties for many applications such as coatings and castings.

Compositions containing epoxide resins, while extremely useful in the cured condition, are generally very viscous in the uncured state, especially when epoxide resins containing aromatic groups are utilized. The viscous characteristic of these resins is a disadvantage in many applications, such as coatings applied by spraying techniques. To overcome this disadvantage, reactive diluents are frequently added to the epoxide resin composition to lower the viscosity. Some typical reactive diluents are prepared by the reaction of epichlorohydrin and monohydric compounds such as allyl alcohol, butyl alcohol, and the like. While such reactive diluents effectively reduce the viscosity of liquid epoxide resin compositions, they also reduce the functionality inasmuch as these compounds react with available oxirane groups.

It has now been discovered that liquid tricyclo-[4.3.0.1$^{2,5}$]decadienes, including those having lower alkyl and halogen substituents, can be utilized as reactive diluents for curable epoxide resin compositions containing a dienophile group, without reducing the functionality of the epoxide composition.

The liquid tricyclo[4.3.0.1$^{2,5}$]decadienes can be incorporated into the uncured epoxide resin by admixing with the liquid epoxide resin at ambient temperature, although solubilization may be accelerated by heatnig the components at a temperature of from about 60° C. to about 100° C. A curing agent may be incorporated into the epoxide resin simultaneously with the reactive diluent, or it may be added before or after the solubilization of the reactive diluent.

The decadienes useful in the practice of this invention have the following structure:

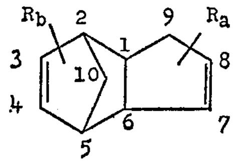

wherein $R_a$ and $R_b$ may be hydrogen or a halogen or lower alkyl group. The decadienes recited in this application are numbered in accordance with the above generalized structure.

The following are representative of the tricyclo-[4.3.0.1$^{2,5}$]decadienes suitable as diluents for epoxide resin compositions:

3,7-tricyclo[4.3.0.1$^{2,5}$]decadiene
dimethyl-3,7-tricyclo[4.3.0.1$^{2,5}$]decadiene
diethyl-3,7-tricyclo[4.3.0.1$^{2,5}$]decadiene
dibutyl-3,7-tricyclo[4.3.0.1$^{2,5}$]decadiene

2 ethyl-methyl-3,7-tricyclo[4.3.0.1$^{2,5}$]decadiene
propyl-3,7-tricyclo[4.3.0.1$^{2,5}$]decadiene
hexyl-3,7-tricyclo[4.3.0.1$^{2,5}$]decadiene
chloro-3,7-tricyclo[4.3.0.1$^{2,5}$]decadiene
bromo-3,7-tricyclo[4.3.0.1$^{2,5}$]decadiene
fluoro-3,7-tricyclo[4.3.0.1$^{2,5}$]decadiene
iodo-3,7-tricyclo[4.3.0.1$^{2,5}$]decadiene
methyl-chloro-3,7-tricyclo[4.3.0.1$^{2,5}$]decadiene
dichloro-3,7-tricyclo[4.3.0.1$^{2,5}$]decadiene
dibromo-3,7-tricyclo[4.3.0.1$^{2,5}$]decadiene
difluoro-3,7-tricyclo[4.3.0.1$^{2,5}$]decadiene
and the like.

The useful diluents of this invention may be prepared by heating cyclopentadiene, a lower alkyl substituted cyclopentadiene, or halogen substituted cyclopentadienes. The tricyclo[4.3.0.1$^{2,5}$]decadienes, also commonly known as dicyclopentadienes, are high boiling liquids which are stable at room temperatures and do not readily decompose to the monomeric form.

As mentioned above, these tricyclo[4.3.0.1$^{2,5}$]-decadiene compounds are effective reactive diluents for curable epoxide resin compositions wherein the composition contains a dienophile group, that is, a $>C=C<$ group capable of undergoing a Diels-Alder reaction with an appropriate diene. Such curable epoxide resin compositions include those wherein the dienophile group is present in an epoxide compound, such as the diglycidyl ether of butenediol, those wherein the dienophile group is present in the curing agent, such as an alpha, beta-ethylenically unsaturated carboxylic anhydride, as for example, maleic anhydride or other acids containing a dienophile group, such as, tetrahydrophthalic anhydride, and those wherein both the epoxide component and the curing agent contain a dienophile group.

Epoxide resins useful in the practice of this invention comprise a relatively large class of materials and many patents have been issued covering these resins. The following are a few of such U.S. patents: 3,001,972, 2,615,608, 2,615,007, 2,582,985.

The epoxide resins are generally characterized by being of high to low molecular weight, containing an oxirane group, that is, a

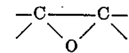

group capable of further reaction to cross-link with other oxirane groups or with other active groups, such as amines or anhydrides and the like, to form a cross-linked polymeric structure.

One class of epoxide resins comprises a polyether which is the product of the condensation of a polyhydric compound and a compound containing an oxirane group, such as epichlorohydrin, in the presence of an alkali which will effect condensation of the compounds to form polyethers. One such polyether which is commonly utilized in the art is bis(4-glycidoxyphenyl)-2,2-propane. It is produced from bis(4-hydroxyphenyl)-2,2-propane (Bisphenol A) and epichlorohydrin in the manner described above. Other members of this class include polyglycidyl ethers of Novolac resins, which are polyphenol resins.

Another class of epoxide resins of general utility are those prepared by epoxidation of unsaturation sites in unsaturated compounds, especially medium to high molecular weight compounds, such as drying or semi-drying oils, as for example, soya oil, olefinic polymers, and the like. The epoxidation of such unsaturated compounds is generally accomplished by the use of peracetic acid. Epoxidized polymers of butadiene have found widespread use and are available commercially. The epoxidized olefinic polymers contain internal as well as terminal oxirane groups. Other compounds of this class include cyclic compounds wherein the carbon atoms of the oxirane group are part of a cyclic hydrocarbon. One such compound, bis(2-methyl-4,5-epoxy cyclohexyl)methylene carboxylate is also available commercially.

Epoxide resins utilizable in the present invention include members of the general classes mentioned above and can generally be described as 1,2-epoxy resins having an epoxy equivalency greater than 1.0 and less than about 4.0. These epoxides may contain a dienophile group; or if they do not, they may be cured with a curing agent containing a dienophile group.

The following compounds are illustrative of epoxides containing dienophile groups:

2,3-bis(glycidoxy)-1-allyloxy-propane
2,2-bis(glycidoxy)-1,3-bis(allyloxy)propane
diglycidyl maleate
diglycidyl itaconate
diglycidyl allylphosphonate
diallyl diglycidyl ether of pentaerythrital
diglycidyl ether of 2,2-bis(hydroxy-3-allylphenyl)-propane and the like.

The following epoxides are representative of ones utilizable for the purposes of this invention with a dienophillic curing agent:

bis(4-glycidoxyphenyl)-2,2-propane
bis(4-glycidoxyphenyl)-1,1-ethane
bis(4-glycidoxyphenyl)-2,2-butane
bis(4-glycidoxyphenyl)methane
bis(4-glycidoxycyclohexyl)-2,2-propane
4,4'-diglycidoxy biphenyl
1,2-diglycidoxyethane
1,3-diglycidoxypropane
1,3-diglycidoxybenzene
1,4-diglycidoxybenzene
butadiene dioxide
diglycidyl ether
1-chloro-2,3-epoxy propane
1-chloro-2,3-epoxy butane
2-chloro-3,4-epoxy butane
1-bromo-2,3-epoxy pentane
1-bromo-4-ethyl-2,3-epoxy pentane
1-chloro-2,3-epoxy octane
1-chloro-2,3-epoxy decane and the like.

Cured epoxy resins containing a reactive diluent of the type described above can be produced from a compound containing an oxirane group, but preferably more than one oxirane group per molecule, and any of the conventional curing agents such as primary, secondary, or tertiary amines, strongly acidic compounds like boron trifluoride, and saturated or unsaturated polycarboxylic acid anhydrides.

The amines and strongly acidic catalysts induce curing of epoxy resins at room temperature although heating of the resin to elevated temperatures accelerates the cure. The amines and strongly acidic catalysts are generally utilized in quantities of about 5 parts to 20 parts per 100 parts of epoxide. Some of the amines conventionally used as curing agents include:

dimethylaminomethylphenol
tri(dimethylaminomethyl)phenol
methyl benzyldimethylamine
ethylenediamine
diethylenetriamine
triethylenetetramine
tetraethylenepentamine and the like.

Anhydrides of various saturated and unsaturated polycarboxylic acids are effective curing agents for epoxides and are generally utilized in ratios of 0.6 to about 1.0 equivalent, or more, of anhydride per equivalent of epoxide. The following are some of the commonly used anhydrides.

(a) Dienophillic anhydrides:
maleic anhydride
tetrahydrophthalic anhydride
glutaconic anhydride
citraconic anhydride
methylendomethylenetetrahydrophthalic anhydride and the like.

(b) Non-dienophillic anhydrides:
phthalic anhydride
pyromellitic anhydride
hexahydrophthalic anhydride
dodecyl succinic anhydride
hexachloroendomethylentetrahydrophthalic anhydride and the like.

As mentioned above, the advantageous properties of the reactive diluents can be realized with non-dienophillic epoxides, such as bis(4-glycidoxyphenyl)-2,2-propane, by the utilization of a dienophillic curing agent, such as the ones described above.

When an anhydride of a saturated or unsaturated polycarboxylic acid is utilized as a curing agent, it is generally preferred to heat the composition to temperatures of about 200° F. or higher to effect complete curing; also, it is occasionally desirable to include a small quantity of an amine catalyst, such as those listed hereinabove, with the anhydride curing agent to accelerate the cure.

The reactive diluents of this invention are especially useful with epoxy resins containing anhydride curing agents as these reactive diluents do not evaporate rapidly at the elevated temperatures generally used for curing such epoxy compositions. Thus, the cured resin is not cellulated and weakened by entrapped vapors of the reactive diluent, but resins containing a volatile reactive diluent are cellulated and weakened.

The curing of epoxide compositions containing a dienophile group and a tricyclo[4.3.0.1$^{2,5}$]decadiene reactive diluent is preferably conducted at elevated temperatures, that is, about 200° F. to about 400° F. or higher, in order to react completely the diluent with the resin.

The above recitation of curing agents is merely representative and there are numerous epoxy curing agents known to the art. A more extensive listing of curing agents is given in Epoxy Resins by Irving Skeist, Reinhold Publishing Company (1958), pages 21–58.

Liquid curable epoxide resin compositions containing a glycidyl ether of an aliphatic saturated or unsaturated polyol are generally less viscous than epoxide compositions containing polyglycidyl ethers of aromatic compounds. However, even with low viscosity liquid curable epoxide compositions, the tricyclo[4.3.0.1$^{2,5}$]decadiene diluents can be effectively utilized to reduce the viscosity of such epoxide compositions without decreasing the functionality of the resin.

Highly viscous curable epoxide resin compositions, such as polyglycidyl ethers of aromatic compounds, as for example, bis(4 - glycidoxyphenyl)-2,2-propane polyglycidyl ethers of Novolac resins and the like, frequently have viscosities in the range of 40,000 to 90,000 centipoises and higher. However, with the addition of minor amounts of a tricyclo[4.3.0.1$^{2,5}$]decadiene diluent, up to about 20 percent by weight of the weight of the resin and preferably up to about 15 percent by weight of the weight of the resin, it is possible to reduce the viscosity of such resins to about 5,000 to 10,000 centipoises or lower.

The following examples illustrate in detail the advantageous utilization of tricyclo[4.3.0.1$^{2,5}$]decadienes as reactive diluents for liquid curable epoxide resin compositions. The examples are not intended to limit the invention, however, for there are, of course, numerous possible variations and modifications.

EXAMPLE I

An epoxy resin was prepared from the following ingredients:

| | Grams |
|---|---|
| Diglycidyl ether of bis(4-hydroxyphenyl)-2,2-propane having an epoxide equivalent weight of 190 | 100 |
| Tetrahydrophthalic anhydride | 76 |
| Benzyldimethylamine | 1.0 |

The above ingredients were admixed at about 80° C. until a homogeneous solution resulted. This solution was poured into a glass cell and cured for 3 hours at 250° F. and then for 4 hours at 300° F.

The cured resin had the following physical properties:

| | |
|---|---|
| Flexural strength, p.s.i. | 17,600 |
| Barcol hardness | 28–38 |
| Tensile strength, p.s.i. | 11,180 |
| Elongation, percent | 4.79 |
| Izod impact, ft.-lbs./in. notched | 0.201 |
| Heat distortion 10 mils at 112° C. | |

EXAMPLE II

Two epoxy resins containing dimethyl-3,7-tricyclo[4.3.0.1$^{2,5}$]decadiene were prepared from the following ingredients:

| | Resin A (grams) | Resin B (grams) |
|---|---|---|
| Diglycidyl ether of bis-(4-hydroxyphenyl) 2,2-propane having an epoxide equivalent weight of 190 | 90.0 | 120.0 |
| Tetrahydrophthalic anhydride | 68.5 | 91.3 |
| Dimethyl-3,7-tricyclo[4.3.0.1$^{2,5}$]decadiene | 15.8 | 21.2 |
| Benzyldimethylamine | 0.9 | 1.2 |

The above ingredients were admixed at about 80° C. until a homogeneous solution resulted. This solution was poured into a glass cell and cured for 3 hours at 250° F. and then for 4 hours at 300° F.

The cured resin had the following physical properties:

| | Resin A | Resin B |
|---|---|---|
| Flexural strength, (p.s.i.) | 18,200 | 16,225 |
| Barcol hardness | 22–29 | 30–34 |
| Tensile strength (p.s.i.) | 7,240 | 11,250 |
| Elongation (percent) | 2.39 | 4.25 |
| Izod impact (ft.-lbs./in. notched) | 0.176 | 0.09 |

EXAMPLE III

The viscosity at 77° F. of a curable epoxy resin having the following composition:

| | Parts |
|---|---|
| Diglycidyl ether of bis(4-hydroxyphenyl)-2,2-propane having an epoxide equivalent weight of 190 | 10 |
| Methyl endomethylene tetrahydrophthalic anhydride | 9 |

was determined to be 1,675 centipoises.

A total of four parts of dimethyl-3,7-tricyclo[4.3.0.1$^{2,5}$]decadiene were added to the above composition in one part increments. The viscosity of the composition after each incremental addition was determined at 77° F. The viscosities at the various dilutions were as follows:

| Epoxy-anhydride composition (parts) | Diluent (parts) | Viscosity at 77° F. (cps.) |
|---|---|---|
| 19 | 1 | 855 |
| 19 | 2 | 500 |
| 19 | 3 | 320 |
| 19 | 4 | 218 |

The last composition containing 10 parts Epon 828, 9 parts anhydride, and 4 parts diluent was cured for three hours at 250° F. and then for four hours at 300° F.

The cured resin had the following physical properties:

| | |
|---|---|
| Flexural strength, p.s.i. | 7,445 |
| Barcol hardness | 18–23 |
| Tensile strength, p.s.i. | 5,843 |
| Elongation, percent | 12.5 |
| Izod impact, ft.-lbs./in. notched | 0.0967 |

Comparable results are achieved when tricyclo[4.3.0.1$^{2,5}$]decadiene, dichloro-3,7-tricyclo[4.3.0.1$^{2,5}$]decadiene and dibromo-3,7-tricyclo[4.3.0.1$^{2,5}$]decadiene are substituted for dimethyl-3,7-tricyclo[4.3.0.1$^{2,5}$]decadiene in the above example.

Although specific examples of the invention have been set forth hereinabove, it is not intended that the invention be limited solely thereto, but to include all of the variations and modifications falling within the scope of the appended claims.

I claim:

1. A method of preparing a cured epoxide resin which comprises heating to a temperature of about 200° F. to about 400° F. a mixture comprising (1) an epoxide resin and (2) a curing agent, at least one of (1) and (2) containing a dienophile group, and up to about 20 percent by weight of a reactive diluent selected from the class consisting of tricyclo[4.3.0.1$^{2,5}$]decadiene, halogen substituted tricyclo[4.3.0.1$^{2,5}$]decadienes and alkyl tricyclo[4.3.0.1$^{2,5}$]decadienes.

2. The method of claim 1 wherein the reactive diluent is dimethyl-3,7-tricyclo[4.3.0.1$^{2,5}$]decadiene.

3. The method of claim 1 wherein the curing agent is an alpha, beta-ethylenically unsaturated carboxylic anhydride.

4. The method of claim 3 wherein the epoxide resin comprises bis(4-hydroxyphenyl)-2,2-propane.

5. The reaction product a mixture comprising of (1) an epoxide resin, and (2) a curing agent, wherein at least one of (1) and (2) contains a dienophile group, and a reactive diluent selected from the class consisting of tricyclo[4.3.0.1$^{2,5}$]decadiene, halogen substituted tricyclo[4.3.0.1$^{2,5}$]decadienes and alkyl tricyclo[4.3.0.1$^{2,5}$]decadienes.

6. A composition comprising (1) an epoxide resin and (2) a curing agent, at least one of (1) and (2) containing a dienophile group, and (3) a reactive diluent selected from the class consisting of compounds corresponding to the formula:

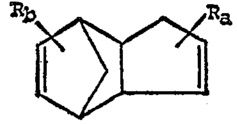

wherein $R_a$ and $R_b$ are selected from the group consisting of hydrogen, halogen, and lower alkyl radicals.

7. The composition of claim 6 wherein the epoxide resin contains a dienophile group.

8. The composition of claim 7 wherein the reactive diluent is tricyclo[4.3.0.1$^{2,5}$]decadiene.

9. The composition of claim 7 wherein the reactive diluent is dimethyl-3,7-tricyclo[4.3.0.1$^{2,5}$]decadiene.

10. A composition comprising (1) an epoxide resin and (2) a curing agent containing a dienophile group, and (3) a reactive diluent selected from the group consisting of tricyclo[4.3.0.1$^{2,5}$]decadiene, dichlorotricyclo[4.3.0.1$^{2,5}$]decadiene, dibromotrichloro[4.3.0.1$^{2,5}$]decadiene and di-lower alkyltricyclo[4.3.0.1$^{25}$]decadienes.

11. The composition of claim 10 wherein the curing agent is an alpha,beta-ethylenically unsaturated carboxylic anhydride.

12. The composition of claim 10 wherein the epoxide resin comprises the reaction product of bis(4-glycidoxyphenyl)-2,2-propane and epichlorohydrin.

13. The composition of claim 12 wherein the curing agent is tetrahydrophthalic acid.

14. The composition of claim 12 wherein the curing agent is methyl endomethylene tetrahydrophthalic anhydride.

15. A composition comprising bis(4-glycidoxyphenyl)-2,2-propane, tetrahydrophthalic anhydride and dimethyl-3,7-tricyclo[4.3.0.1$^{2,5}$]decadiene.

16. A composition comprising bis(4-glycidoxyphenyl)-

2,2-propane, methyl endomethylene tetrahydrophthalic anhydride and dimethyl-3,7-tricyclo[4.3.0.1$^{2,5}$]decadiene.

References Cited

UNITED STATES PATENTS

| | | | |
|---|---|---|---|
| 2,667,463 | 1/1954 | Jakob et al. | 260—47 |
| 2,812,371 | 11/1957 | Green | 260—666 |
| 2,848,433 | 8/1958 | Eirich | 260—47 |
| 3,078,253 | 2/1963 | Davies et al. | 260—75 |
| 3,134,682 | 5/1964 | Vogel et al. | 117—132 |
| 3,288,882 | 11/1966 | Stark et al. | 260—836 |

OTHER REFERENCES

"Dicyclopentadiene Methyl Cyclopentadiene Dimer," Enjay Chemical Co., Chemicals Division, 60 W. 48th St., New York, N.Y., pp. 1, 2, 3, 5, 14, 15 relied upon.

MORRIS LIEBMAN, *Primary Examiner.*

J. E. CALLAGHAN, *Assistant Examiner.*